Feb. 23, 1926.
C. STERZING
COATING MACHINE
Filed April 9, 1925
1,574,178
2 Sheets-Sheet 1
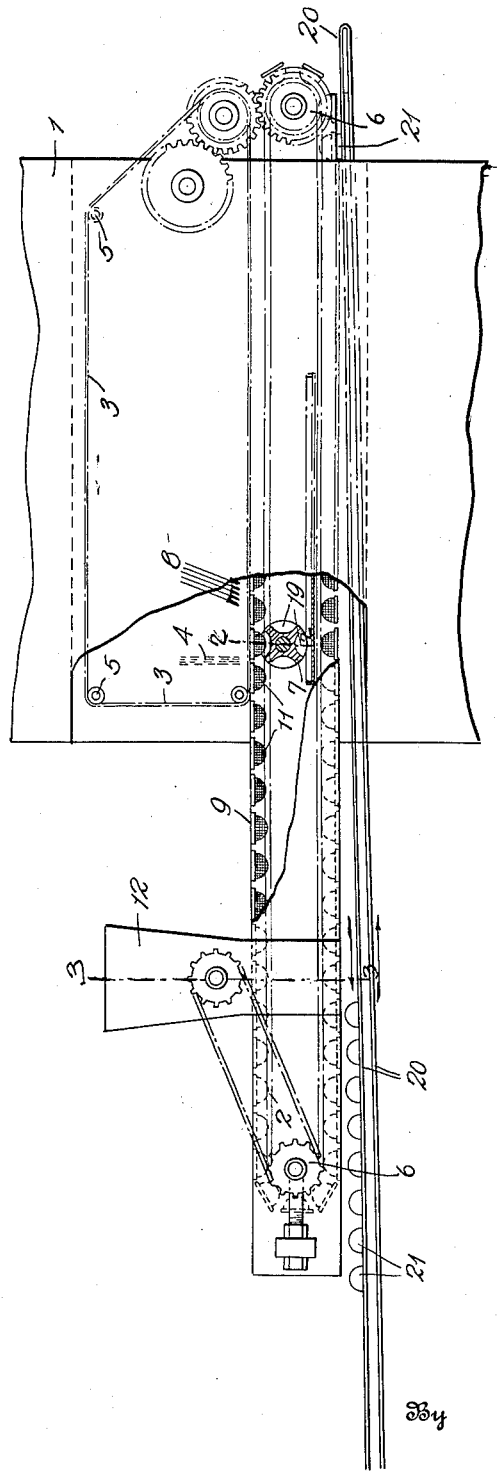
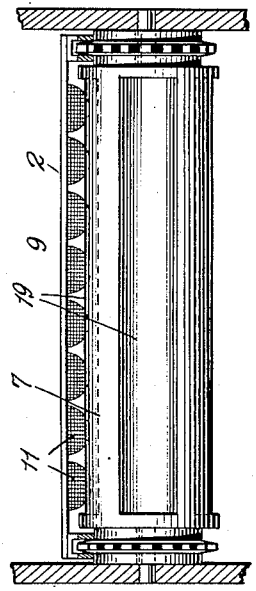
Inventor
Carl Sterzing
E.W. Anderson
By
Attorney Feb. 23, 1926. 1,574,178
C. STERZING
COATING MACHINE
Filed April 9, 1925  2 Sheets-Sheet 2
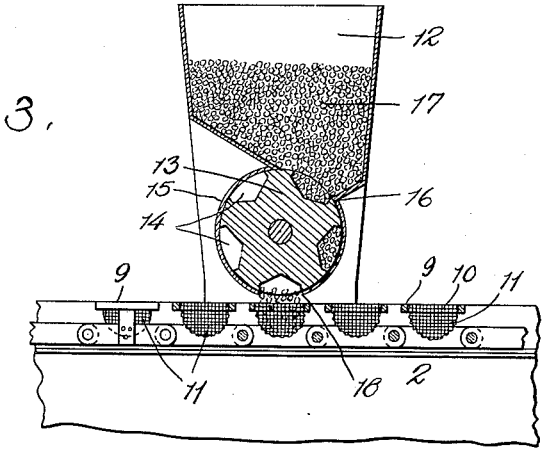
Fig. 3.
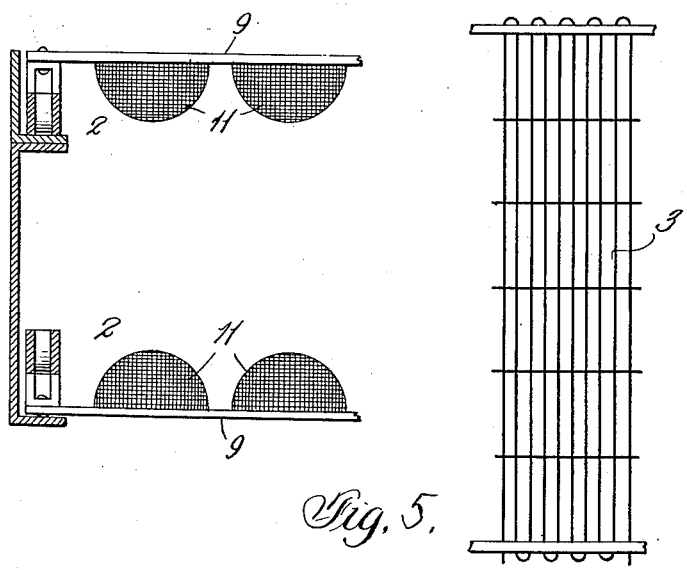
Fig. 4.
Fig. 5.
Inventor
Carl Sterzing,
E.W. Anderson
By
Attorney Patented Feb. 23, 1926.

1,574,178

UNITED STATES PATENT OFFICE.

CARL STERZING, OF BURLINGTON, IOWA.

COATING MACHINE.

Application filed April 9, 1925. Serial No. 21,925.

*To all whom it may concern:*

Be it known that I, CARL STERZING, a citizen of the United States, resident of Burlington, in the county of Des Moines and State of Iowa, have made a certain new and useful Invention in Coating Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention, partly in section and partly diagrammatic.

Figure 2 is a section on the line 2—2 of Figure 1.

Figure 3 is a section on the line 3—3, of Figure 1.

Figure 4 is a detail fragmentary transverse section of one side of the conveyor.

Figure 5 is a fragmentary plan view of the porous belt.

The invention has relation to coating machines for making cluster confections composed of nuts of any kind, dried fruits, or the like in clusters, coated with chocolate, sugar or other binder, an object being to provide an improved machine of this kind that will automatically charge the feed conveyor with clusters of nuts or the like to be coated, the invention being adapted for use as an attachment to various makes of coating machines, such as the "Greer" coater, the "Universal" coating machine, etc. Other objects will appear hereinafter.

The invention consists in the novel construction and combinations of parts, as hereinafter set forth.

In the accompanying drawings illustrating the invention, the numeral 1 designates the coating compartment wherein the goods receive their coating, the endless conveyor 2 passing through this coating compartment and carrying the goods to be coated therethrough, an upper endless porous or wire belt 3 in said compartment overlying said conveyor and serving to retain the goods in place while being coated and while subject to the air blast of said compartment to blow off excess coating material, the flood of warm liquid coating material being discharged from above in said compartment and represented in the drawings diagrammatically at 4, the belt 3 passing around rollers 5, and the conveyor being carried by end rollers 6 and passing over roller 7 in the coating compartment, the air blast of said coating compartment being represented diagrammatically at 8.

The invention being applicable to any of said well known coating machines on the market, these machines are not shown in full.

The endless conveyor 2 is composed of flexibly connected transverse links 9, elongated respectively and provided each with a transverse series of perforations or openings 10, preferably circular, and having registering with each opening a depending wire basket or receptacle 11, also in horizontal series, and fast or rigid with said links.

The conveyor 2 passes beneath hopper 12, provided with a horizontal feed roller 13, having multiple horizontal series of circumferential pockets 14. This feed roller is surrounded by a horizontal hollow cylinder or tube 15, having at one side a horizontal series of circular openings 16, adapted for registration with each horizontal series of pockets 14 or with successive series of said pockets in the rotation of the feed roller, whereby the loose nuts or dried fruit 17 in the hopper will be delivered through force of gravity to said pockets and will be similarly discharged through a bottom horizontal series of circular openings 18 of said hollow cylinder at the precise times that the links 9 come respectively into registration with the center of said roller, the operation of the parts being timed so that successive horizontal series of pockets of the feed roller are charged with the loose nuts or dried fruit and the same are successively discharged to fill the horizontal series of openwork receptacles of successive links 9.

As the conveyor 2 carrying the goods passes into the coating compartment 1, the goods contained in the openwork depending receptacles 11 will have the tops thereof coated by the warm liquid coating material discharged from above at 4, surplus coating material being partly caught by the horizontal circumferential longitudinal pockets 19 of roller 7 arranged transversely of the machine and positively rotated at the same speed that the conveyor 2 is moved, said roller retaining in its grooves ample coating material and in the rotation thereof applying this excess of coating material exactly in contact with the bottoms and sides of the goods contained in the depending openwork receptacles 11 of the links 9 and completing the coating thereof.

The wire belt 3 of the coating compartment is driven at the same speed as that of the conveyor 2 and in the same direction, being positively driven by gear train receiving its movement directly from the coating machine. The conveyor 2 after passing under the stream of coating material 4 next comes into the air blast 8 which blows off surplus coating material. The endless wire belt 3 bears directly upon the links 9 of the conveyor 2, covering the receptacles 11 and preventing the contents thereof from being blown out by said air blast.

The finished or coated goods are discharged from the conveyor 2 upon a lower endless belt or conveyor 20, and moving at the same speed and in the same direction as the bottom stretch of the conveyor 2. The contents of the openwork receptacles or the coated goods 21 will not discharge until partly through the conveyor 2 and uniformity of delivery will be maintained by allowing no clearance between the conveyor 2 and the discharge conveyor at one end, but at the opposite end the coated goods have full clearance from the conveyor 2.

I claim:—

1. In a coating machine for cluster confections, a coating compartment, an endless conveyor for the cluster fillings of said confections having an endless succession of openwork pockets and passing through said coating compartment, means for charging the conveyor pockets with a succession of cluster fillings, a pocketed roller in the coating compartment over which said conveyor passes and with the pockets of which the conveyor pockets engage, and means for discharging a stream of warm liquid coating material upon the charges of the conveyor pockets to coat the tops thereof, the pockets of said roller catching excess coating material and applying the same to the sides and bottoms of said charges to complete the coating thereof.

2. In a coating machine for cluster confections, a coating compartment, an endless conveyor for cluster fillings of said confections having an endless succession of openwork pockets and passing through said coating compartment, means for charging the conveyor pockets with a succession of cluster fillings, an endless openwork belt in the coating compartment covering the tops of said conveyor pockets, a pocketed roller in the coating compartment over which said conveyor passes and with the pockets of which the conveyor pockets engage, means for discharging a stream of warm liquid coating material upon the charges of the conveyor pockets to coat the tops thereof, and means in the coating compartment for blowing off excess coating material, the pockets of said roller catching excess coating material and applying the same to the sides and bottoms of said charges to complete the coating thereof.

3. In a coating machine for cluster confections, a coating compartment, an endless conveyor for the cluster fillings of said confections having transverse flexibly connected links provided each with a horizontal transverse series of depending openwork pockets and passing through said coating compartment, means for charging the conveyor pockets with a succession of cluster fillings, a pocketed roller in the coating compartment over which said conveyor passes and with the pockets of which the conveyor pockets engage, and means for discharging a stream of warm liquid coating material upon the charges of said pockets of the conveyor to coat the tops thereof, the pockets of said roller catching excess coating material and applying the same to the sides and bottoms of said charges to complete the coating thereof.

In testimony whereof I affix my signature.

CARL STERZING.